No. 11,942. Reissued Nov. 5, 1901.

I. J. BAYLESS.

OPEN-TOED HORSESHOE.

(Application filed Mar. 30, 1901.)

Witnesses.

H. C. Rodgers.

Arthur McArthur

Inventor:

Irving J. Bayless.

By Fisher & Hoyt

Att'ys.

UNITED STATES PATENT OFFICE.

IRVING JAMES BAYLESS, OF KANSAS CITY, MISSOURI.

OPEN-TOED HORSESHOE.

SPECIFICATION forming part of Reissued Letters Patent No. 11,942, dated November 5, 1901.

Original No. 665,050, dated January 1, 1901. Application for reissue filed March 30, 1901. Serial No. 53,650.

*To all whom it may concern:*

Be it known that I, IRVING JAMES BAYLESS, a citizen of the United States, residing at Kansas City, in the county of Jackson and State of Missouri, have invented a new and useful Open-Toed Horseshoe, of which the following is a specification.

My invention relates to improvements in horseshoes and to a novel method of constructing the shoe proper, which consists in leaving the front end of the shoe open until after it has been conformed to the horse's foot, so that such conformation can be effected without any changes in the heel portion of the shoe and all necessary modifications from the normal form as produced by the dies be accomplished by proper bending up or other manipulation of the toe portion.

Figure 1:
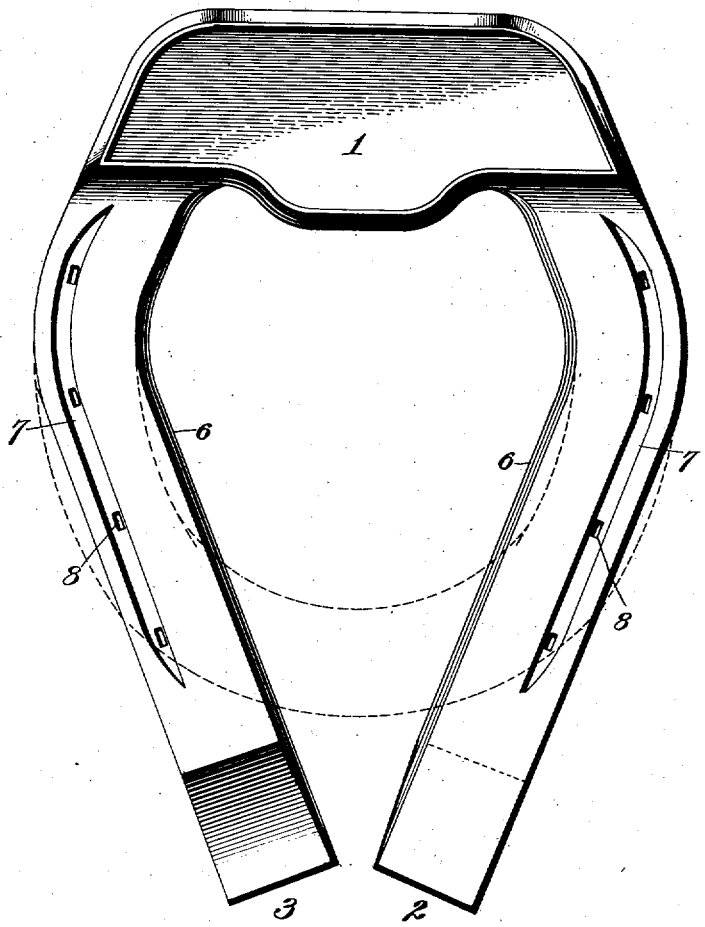
Figure 2:
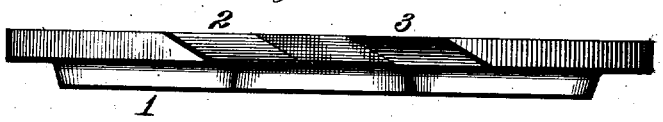
Figure 3:
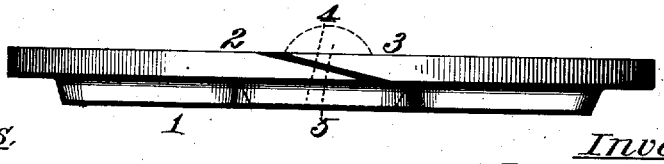

In the accompanying drawings, Figure 1 is an inverted plan view of an open-toed horseshoe constructed in accordance with my invention, said figure also showing in dotted lines the toe portion formed by properly bending and welding together the front ends of the side portions. Fig. 2 is a front view of Fig. 1 with the shoe inverted with respect to the latter. Fig. 3 is a similar view, but with the front ends of the side portions bent to overlap each other preliminary to the welding operation.

The shoe is formed with the bar portion 1 extending entirely across its rear end, the same being integral with or rigidly secured to the sides. The front portion of the shoe as it comes from the dies is entirely open. This method of manufacturing the shoe makes it possible for the blacksmith to fit it to the hoof by bending in or out the toe-sections without disturbing the heel portion, thus fitting the shoe to the hoof from the heel forwardly. The front ends of the sides are wedge-shaped or attenuated, as shown at 2 3, in order to facilitate the welding together of said parts in completing the shoe; but as the blacksmith in fitting the latter to a particular hoof must in the majority of instances cut off more or less of the front portion of the sides it is obvious that the attenuation of the front ends of the side portions to facilitate welding should occur after and not before the shoe has been fitted. This is self-evident, from the fact that if the attenuation produced by the dies determined the point of welding all shoes would be of the same size and the value of the invention therefore negatived, the object of the latter being to produce a shoe which can be made to accommodate hoofs the same size across the heel, but differing in size and configuration forward thereof.

Of course the shoe as it comes from the dies can be formed with the wedge-shaped terminals, as the same can be cut off, if necessary, to foreshorten the sides preparatory to welding, the smith after thus foreshortening the sides again attenuating their ends in order that when overlapped they may be welded together in less time than if such ends were of the same thickness as the body of the side portions. The result would be the same in both cases; but it would take the blacksmith longer to make the weld in the latter case.

After the toe-sections 2 and 3 have been welded together the calk 4 and tip 5 (shown in dotted lines in Fig. 3) may be added. The inner sides of the shoe, including the bar, are provided with the outward bevel, as shown at 6 in Fig. 1, to prevent the accumulation of snow or other matter, and the shoe is provided with the usual grooves 7 to receive the nail-heads and with registering nail-holes 8.

The form or configuration of the bar 1 is unimportant and has no bearing on the invention, nor has the pad to be secured to the bar any bearing on the present invention. It has therefore been omitted as superfluous.

Having thus described the invention, what I claim as new, and desire to secure by Letters Patent, is—

1. A horseshoe, consisting of a transverse bar portion and side portions integral with or attached to the ends of the bar portion, at their rear ends, and adapted to have their front ends overlapped and welded together to complete the shoe, substantially as described.

2. A horseshoe, comprising a bar or heel portion, side portions connected integrally or rigidly at their rear ends to the heel portion, disconnected at their front ends, and provided with wedge-shaped terminals, adapting the shoe to be fitted to the hoof from the heel forward, and said terminals to be welded together thereafter, substantially as described.

In testimony whereof I have signed my name to this specification in the presence of two subscribing witnesses.

IRVING JAMES BAYLESS.

Witnesses:

H. C. RODGERS,

G. Y. THORPE.